Jan. 31, 1950      J. D. WESTON      2,495,795

ALTIMETER

Filed May 11, 1945      2 Sheets-Sheet 1

Inventor
JEFFREY DENNIS WESTON
By
*Attorney*

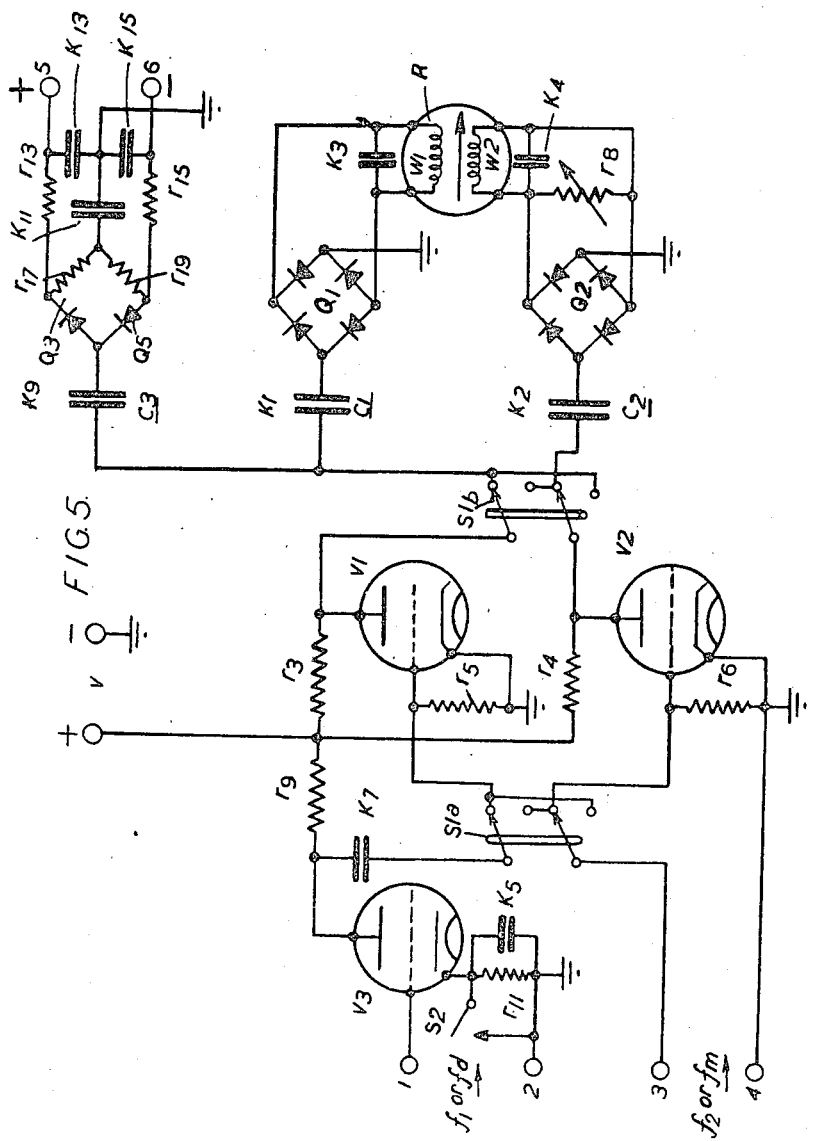

Patented Jan. 31, 1950

2,495,795

UNITED STATES PATENT OFFICE 2,495,795

ALTIMETER

Jeffrey Dennis Weston, London, England, assignor, by mesne assignments, to International Standard Electric Corporation, New York, N. Y., a corporation of Delaware Application May 11, 1945, Serial No. 593,159
In Great Britain March 20, 1944

Section 1, Public Law 690, August 8, 1946
Patent expires March 20, 1964

9 Claims. (Cl. 177—352)

The present invention relates to electrical frequency measuring devices, and to the application of such devices to radio altimeters.

One well known type of altimeter suitable for aircraft, sometimes known as a beat frequency altimeter, is of the kind comprising a transmitter which radiates waves which are frequency modulated by a low frequency wave, and which are picked up by a receiver after reflection from the ground, and the beat frequency, that is the difference between the frequencies of the transmitted and reflected waves, is determined by suitable means which translates the result of the determination into the corresponding height above ground.

The arrangements hitherto used for obtaining the height indication have several elements or parameters liable to variation which result in variable errors in the indication, and since it is of the utmost importance that the apparatus should indicate correctly at all times, or not at all, considerable trouble has been experienced in the past in dealing with these variable sources of error. It is the principal object of the present invention, therefore, to reduce the number of parameters whose variation can affect the accuracy of the result, and to reduce the effects of the variation of other parameters.

In the arrangements which have hitherto been used, it is usual to employ a frequency discriminating device or counter which translates the difference frequency of the transmitted and reflected waves into a direct current of corresponding magnitude, and to measure this current on an instrument of the ordinary milliammeter type, which may be calibrated in metres, for example, so that it reads the height directly.

As will be explained later on in this specification, some of the sources of error mentioned above can be substantially eliminated by using a ratiometer instead of the milliammeter instrument. A ratiometer is a current indicating instrument of known type having two operating coils, whose reading is proportional to the ratio of two currents supplied separately to the two coils, but is independent of the actual magnitude of either current. The use of such an instrument, together with other simple expedients to be described, permits the substantial elimination of the effects of variations of those parameters which are the most troublesome to control.

Thus the above mentioned object is achieved according to the invention by providing an arrangement for measuring the frequency of electrical waves comprising means for deriving from the said waves an electric current whose magnitude depends upon the said frequency, means for supplying the said current to one operating coil of a ratiometer, and means for supplying a reference current to the other operating coil of the ratiometer.

While the application of the invention of principal interest is to altimeters, it is not restricted to such applications, being useful for measuring the frequency of electric waves obtained in any way.

The invention will be described with reference to the accompanying drawings in which:

Fig. 5 shows circuit details of a preferred form of the arrangement of Fig. 3.

Figure 1:
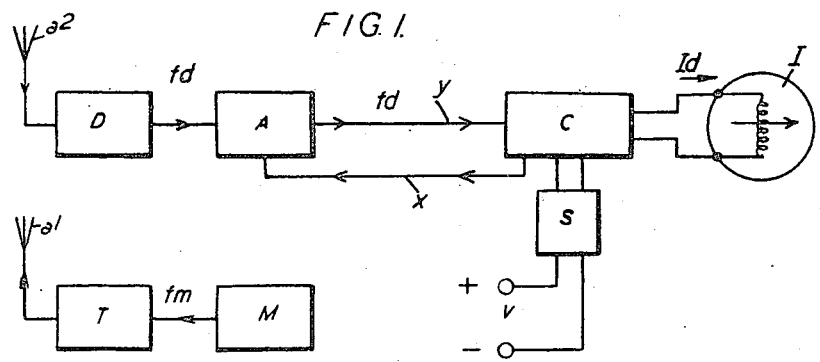
Fig. 1 shows a block schematic circuit diagram of a known type of beat frequency altimeter.

Fig. 1 shows an example of a well known beat frequency altimeter arrangement. A transmitter T supplies waves to an antenna $a_1$ which radiates them towards the ground. The waves are frequency modulated, usually according to a linear law, by means of a modulator M, which will be assumed to modulate the waves so that the frequency varies in saw-tooth fashion. The waves reflected from the ground are picked up by an antenna $a_2$ and are supplied to the detector D. The antennas $a_1$ and $a_2$ are generally of a directional nature and are so placed that they transmit and receive efficiently to and from the ground, but $a_2$ can also pick up a small amount of wave energy direct from $a_1$. Thus waves having both the transmitted and reflected frequencies are mixed and applied to the detector D, from the output of which the difference or beat frequency, which depends on the altitude, is obtained. The beat frequency waves are applied through an amplifier A to a frequency counter circuit C which derives from the waves a direct current proportional to the beat frequency, this direct current being measured by an ordinary direct current indicating instrument I of any suitable pattern, generally calibrated in altitude for convenience. The counter C generally contains an electronic switch, a differentiating reactor and a rectifier, and the switch is energised from a direct current source of voltage V connected to the terminals + and —. The current measured by the instrument I depends on the value of V, so that if this voltage is variable, it is essential to provide a suitable stabilising arrangement S, otherwise the readings of the apparatus will be unreliable. A suitable feedback gain control voltage may be derived in the counter C and applied by the conductor $x$ to the amplifier A for modifying its gain according to the usual practice.

It is well known that the beat or difference frequency $f_d$ is connected with the altitude $h$ by the relation $$f_d = 4f_m.F.h/v \qquad (1)$$

where $f_m$ is the frequency of the modulating sawtooth wave, F is the difference between the maximum and minimum transmitted frequencies, and $v$ is the velocity of propagation of phase in space The current $I_d$ measured by the instrument I is proportional to both V and $f_d$, so that $$I_d = kVf_d \qquad (2)$$

where $k$ is a constant depending on the elements in the counter C.

Combining Equations 1 and 2, there results $$I_d = 4k.f_m.V.F.h/v \qquad (3)$$

Let H be the altitude reading of the instrument I, then $H = K.I_d$, so $$H = 4K.k.f_m V.F.h/v \qquad (4)$$

in which K depends on the properties of the instrument I.

In order to be able to adjust the readings of the apparatus, one of the parameters in Equation 4 should usually be adjustable. Of these, K is probably the most convenient to adjust, by providing the instrument I with a variable shunt, or by some similar arrangement.

In order that there shall be an invariable relation between H and $h$, all the other quantities must remain constant. Of these $v$ is an absolute constant, and K (even when an adjustable shunt is used) is usually substantially invariable, at least within the accuracy necessary for the apparatus, and F and $f_m$ must however be stabilized by some suitable known means. This leaves $k$ and V. As already mentioned, it is the practice to provide a stabiliser such as S when V is variable. The constant $k$ however generally varies with temperature on account of the nature of the elements in the counter and has hitherto not been satisfactorily dealt with.

According to the present invention, the effects of the variations of V, $k$ and $f_m$ can be substantially eliminated in a simple way if a ratiometer is used instead of the instrument I.

Figure 2:
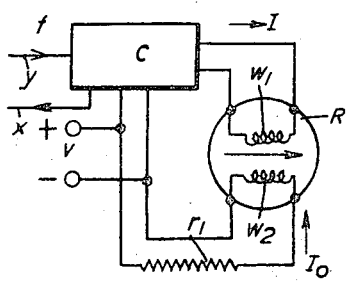
Figs 2 and 3 show schematic circuit diagrams of frequency measuring arrangements according to the invention.
Figure 3:
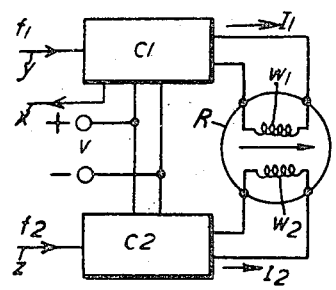

Fig 2 shows a frequency measuring arrangement according to the invention in its simplest form which can be applied to an altimeter of the type illustrated in Fig. 1, in which case the effects of the variations of V are eliminated, but not those of $k$ or $f_m$. Fig. 3 shows another frequency measuring arrangement according to the invention which is adapted for measuring the ratio of two frequencies. If this be applied to Fig. 1, the effects of the variations of V, $k$ and $f_m$ may all be substantially eliminated. Thus in neither case is it necessary to provide a stabilizing device such as S.

Referring to Fig. 2, waves whose frequency $f$ is to be measured are applied to the input of a frequency counter C adapted to produce an output current I proportional to $f$. The current I is supplied to the winding $w_1$ of a ratiometer R. The counter C is energised from a source of voltage V which may be variable, and this voltage is also applied to the second winding $w_2$ of the ratiometer, through a suitable resistance $r_1$, for example, producing a reference current $I_0$. The circuit for $I_0$ may contain any suitable combination of series and/or shunt resistances.

Then, as before, $I = kVf$, and also $I_0 = V/r_0$, in which $r_0$ is a resistance depending on the resistance of winding $w_2$ and on any other resistance in series or shunt therewith. The resistance $r_0$ can easily be made substantially constant. It follows that $$f = \frac{I}{I_0 k r_0}$$

If it be supposed that the ratiometer R is calibrated in terms of frequency, let P be its reading then $$P = K_0 \cdot \frac{I}{I_0}$$

where $K_0$ is the constant of the ratiometer, and it follows that $$f = \frac{P}{kK_0 r_0} \qquad (5)$$

which is independent of V.

The frequency measuring device of Fig. 2 may be applied to Fig. 1 by connecting it in place of the elements C, I, and S to the conductors $x$ and $y$. The conductor $x$ may convey to the amplifier A the feedback control voltage which can be derived in the counter C as before.

By dividing both sides of Equation 3 by $I_0$ there is obtained $$\frac{I_d}{I_0} = 4k.f_m.r_0.F.h/v$$

since $V/I_0 = r_0$.

If H is the reading of the ratiometer corresponding to the altitude $h$, then $$H = K_0 \cdot \frac{I_d}{I_0} = 4k.K_0.f_m.r_0.F.h/v \qquad (6)$$

This is independent of V, but will still be affected by the variations of $f_m$ and $k$.

Referring now to Fig 3, $C_1$ and $C_2$ are two similar frequency counters the outputs of which are respectively connected to the windings $w_1$ and $w_2$ of the ratiometer R. The counters are both energised from the same source of voltage V, which may be variable. Waves of two frequencies $f_1$ and $f_2$ to be compared are applied respectively to the input terminals of $C_1$ and $C_2$ at $y$ and $z$.

The counters $C_1$ and $C_2$ should be made up of elements of similar types in order that the changes of temperature and other sources of variation may be expected to affect both counters in the same way. In other words the constants $k$ though not necessarily equal for the two counters will vary in substantially the same way. It has however been mentioned that such counters usually contain an electronic switch, that is, a valve operated so that it opens and closes a circuit like a switch. Under these conditions, variable differences between two similar valves operated under similar conditions, which are liable to be rather large, have very little effect on the performance of the counter.

Then if $I_1$ and $I_2$ are the currents through the windings $w_1$ and $w_2$ of the ratiometer, then $$I_1 = k_1 V f_1 \text{ and } I_2 = k_2 V f_2$$

so $$\frac{f_1}{f_2} = \frac{k_2}{k_1} \cdot \frac{I_1}{I_2} = A \frac{P}{K_0}$$

in which P and $K_0$ are the reading and constant of the ratiometer as before, and $A = k_2/k_1$, which is substantially constant.

Thus the measurement of the ratio of the two frequencies is not subject to errors due to the counter circuits or to the variations of the operating voltage. In order to obtain a value for $f_1$ alone, the frequency $f_2$ could be a standard reference frequency obtained from a local source. The reference current $I_2$ flowing through the winding $w_2$ would then be constant, and the ratiometer could be calibrated to read the frequency $f_1$ directly.

Figure 4:
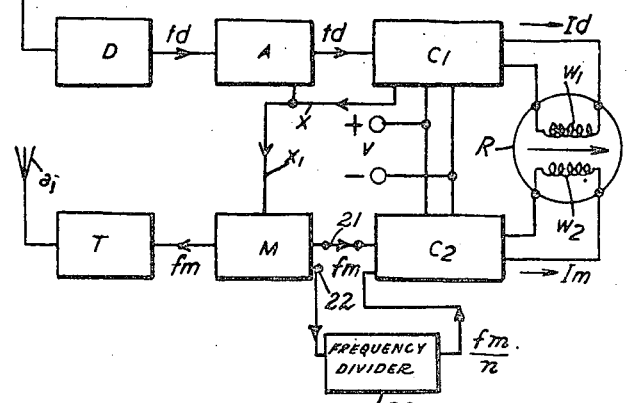
Fig. 4 shows a block schematic circuit diagram of a preferred form of beat frequency altimeter according to the invention.

Fig. 4 shows how the arrangement of Fig. 3 could be applied to the altimeter shown in Fig. 1. Those elements which are the same in the various figures are designated in the same way and will not be again described. The output waves at frequency $f_d$ from the amplifier A are applied to the counter $C_1$, and the modulating waves at frequency $f_m$ are supplied from the modulator M to the counter $C_2$. The feedback voltage may be supplied from $C_1$ to A along the conductor $x$ as before.

The test current $I_d$ and the reference current $I_m$ proportional respectively to $f_d$ and $f_m$ are supplied to the windings $w_1$ and $w_2$ of the ratiometer R from the counters $C_1$ and $C_2$.

From Equation 3 above, $$I_d = 4k_1 . f_m . V . F . h/v \quad (3A)$$

The two counters $C_1$ and $C_2$ being similar, Equation 2 can be re-written for $C_2$ as follows:

$$I_m = k_2 . V . f_m \quad (7)$$

where $k_2$ is the constant corresponding to $k$ for $C_2$.

Thus from Equations 3A and 7

$$\frac{I_d}{I_m} = 4\frac{k_1}{k_2} . F . h/w$$

Hence as in Equation 6, the reading H of the ratiometer is given by $$H = K_0 . \frac{I_d}{I_m} = 4 K_0 . \frac{k_1}{k_2} . F . h/v \quad (8)$$

Now if the components of $C_1$ and $C_2$ are of similar types they may be expected to vary similarly with temperature and the like. Thus although the constants $k_1$ and $k_2$ may not be equal, their ratio will remain practically constant. Hence Equation 8 can be written $$H = A . K_0 . F . h/v \quad (9)$$

where A is a constant depending on the counter and ratiometer circuits, and may be made adjustable, for example by means of a suitably arranged variable resistance.

It will be seen that V and $f_m$ have disappeared from Equation 9 and the variations due to the constants $k_1$ and $k_2$ are mutually compensated. The only possible variable factors left are $K_0$ and F, of which the first is easily maintained constant. It is to be noted that the circuits of $C_1$ and $C_2$ could be designed so that A varies with temperature in such a way as to compensate to a first order for variations in F (and in $K_0$ if necessary). Thus these counters could include attenuating networks containing temperature dependent resistances appropriately arranged according to well known principles.

The fact that $f_m$ does not appear in the formula for H permits this frequency to be purposely varied in accordance with the altitude in order to reduce the width of the frequency band necessary to be covered by the receiver. This variation may be automatically obtained by applying the feedback control voltage derived in the counter $C_1$ for the amplifier A in an appropriate manner to the modulator M as indicated by the connection $x_1$ shown in Fig. 4. This modification will be more fully described later.

Fig. 5 shows a schematic circuit diagram of a preferred form of the arrangement of Fig. 3. The counter circuit of $C_1$ comprises the switching valve $V_1$, the condenser $K_1$ and the bridge rectifier $Q_1$; and the counter circuit of $C_2$ comprises the switching valve $V_2$ condenser $K_2$, bridge rectifier $Q_2$ and an adjustable resistance $r_8$. The windings $w_1$ and $w_2$ of the ratiometer R are connected to the output diagonal terminals of $Q_1$ and $Q_2$, and the condensers $K_3$ and $K_4$ are smoothing condensers for the windings $w_1$ and $w_2$ respectively.

The operating voltage V of Fig. 3 is the anode supply voltage for the two valves $V_1$ and $V_2$ and is applied to their anodes through appropriate series resistances $r_3$ and $r_4$. The cathodes of the two valves are earthed and the control grids are connected to the cathodes by the usual leak resistances $r_5$ and $r_6$.

The counter circuit $C_1$ is preceded by an amplifying stage comprising a valve $V_3$ whose anode is coupled by the condenser $K_7$ to the control grid of $V_1$, and is supplied with current from the source of the voltage V through a resistance $r_9$. The cathode is earthed through a biasing circuit comprising a resistance $r_{11}$ shunted by a condenser $K_5$. Waves at the two frequencies to be compared are applied at terminals 1, 2 and 3, 4 respectively as indicated.

The input and output connections of the valves $V_1$ and $V_2$ are made respectively through two switches $S_{1a}$ and $S_{1b}$ which are intended to be mechanically connected to operate together. These switches are provided for the purpose of interchanging the two valves $V_1$ and $V_2$ in order to check the operation of the circuit. For similar checking purposes, a switch $S_2$ is provided to short-circuit the bias resistance $r_{11}$ for the purpose of changing the amplification of the valve $V_3$ (which may be of the variable $\mu$ type). These two switches are of special importance when the arrangement is used in an altimeter in the manner shown in Fig. 4, but they are not essential and could be omitted. Likewise, the amplifying valve may not always be necessary and can be omitted if desired, together with the circuit elements associated with it, in which case the terminal 1 would be connected directly to the upper movable contact of the switch $S_{1a}$, or directly to the control grid of $V_1$, if the switch is omitted.

The amplitude of the waves applied respectively to the control grids of $V_1$ and $V_2$ should be sufficiently great to block and unblock each valve for substantially the whole of alternate half periods, respectively, of the corresponding wave, so that each valve acts practically like a switch which is open for one half period, and closed for the next, and so on. During the periods when the valve $V_1$ is non-conducting, the condenser $C_1$ charges up in the circuit from the positive terminal of V, resistance $r_3$ rectifier $Q_1$ and winding $w_1$ to ground. When the valve is unblocked, the condenser discharges to earth at the cathode of $V_1$, and the discharge current flows through $w_1$ in the same direction as the charging current by the action of the rectifier $Q_1$. The current through $w_1$ is then proportional to the frequency of the waves applied to $V_1$. The other counter circuit $C_2$ operates in just the same way, but the variable shunt resistance $r_8$ enables the current through $w_2$ to be adjusted in order to set the readings of the ratiometer.

As already explained, the valves $V_1$ and $V_2$ should be alike, the condensers $K_1$ and $K_2$ should be of the same type, and the rectifiers $Q_1$ and $Q_2$ should be similar, in order that the constants $k_1$ and $k_2$ shall vary in the same way for both counters. It may be convenient to provide small adjustable trimming condensers in parallel with $K_1$ and $K_2$ in order to facilitate the adjustments of the circuits.

An auxiliary counting circuit $C_3$ may be provided in order to supply the feedback voltage for controlling the amplifier A as indicated in Fig. 4. This auxiliary counting circuit comprises a differentiating condenser $K_9$, two single rectifiers $K_3$ and $Q_5$ arranged in a bridge with two resistances $r_{17}$ and $r_{19}$ and a balanced smoothing arrangement comprising two resistances $r_{13}$ and $r_{15}$ and two condensers $K_{13}$ and $K_{15}$ whose common point is earthed and connected to the adjacent bridge corner by the blocking condenser $K_{11}$. A balanced voltage proportional to the frequency of the waves applied to terminals 1 and 2 will be obtained at terminals 5 and 6.

It has already been mentioned in connection with Fig. 4 that the modulation frequency $f_m$ may be varied in order to reduce the width of the frequency band which must be passed by the receiver. If, for example, the modulating wave is generated by a relaxation oscillator, the modulation frequency $f_m$ can be easily varied by employing the voltage derived at the terminals 5 and 6 to control the plate circuit impedance of a valve, which impedance may form part of the relaxation oscillation circuit. By this means it is easily possible to cause the frequency $f_m$ to decrease as $f_d$ increases, so that the rate of increase of $f_d$ with altitude is decreased, thus with a given altitude range, the width of the frequency band applied to the receiver is reduced. This reduces the effects of interference and simplifies the design of the amplifier. With this arrangement the Equation 9 still gives the relation between the altitude and the reading of the ratiometer.

Thus the reference current $I_m$ varies with altitude as well as the test current $I_d$, and the control effect can be made so large that $I_d$ is nearly constant, and $I_m$ varies nearly inversely with $f_d$. The fact that $f_m$ varies over a wide range does not introduce serious difficulties because the output voltage of the relaxation oscillator is approximately constant and is not normally subject to interference.

It should be pointed out that with this arrangement a temporary loss of the incoming signal would reduce the control voltage at terminals 5 and 6 to zero, and this would cause the frequency $f_m$ to assume its maximum value. Thus, when the signal reappears, the frequency $f_d$ might not lie within the pass band of the receiver so that the apparatus would fail to operate until the altitude becomes very low. Momentary loss of the signal caused by poor reflection, for example, could be guarded against by giving the control circuit a long time constant. A loss of signal would occur if the aircraft should rise beyond the range of the altimeter and then should descend again, so in order to prevent this some form of interlock control would be necessary. Such an interlock control might be on the following lines, for example. An auxiliary valve could be arranged to bias the modulator M so that it generates the minimum value of $f_m$ when there are no signals. When the signal appears on the descent of the aircraft, it could be arranged to paralyse the auxiliary valve, for example, by biasing it beyond the cut-off, thus allowing the signal to take control of $f_m$ in the manner already explained.

The question of the loss of signal could also be dealt with in another way. If the amplifier were arranged to have some response over a narrow band corresponding to the value of $f_d$ which would be produced at maximum altitude with maximum value of $f_m$, then the apparatus would always come into operation on descent if the control circuit had a large enough time constant.

The switches $S_{1a}$, $S_{1b}$ and $S_2$ in Fig. 5 are provided as safety switches for checking the operation of the counters when the arrangement is used in an altimeter. It has already been pointed out that ordinary variations in the valves $V_1$ and $V_2$ will not have any appreciable effect on the operation of the counters, but a very large variation perhaps amounting to a fault in one of them may cause a false reading. This can be checked at any time by operating the switches $S_{1a}$ and $S_{1b}$ to interchange the valves, and if any change in the altitude reading is obtained one of the valves is probably defective, and the true altitude will probably lie between the two values obtained.

Furthermore, as long as the amplitude of the waves applied to the switching valves is above a certain minimum, the reading of the apparatus is substantially independent of this amplitude. Thus by operating the switch $S_2$ the amplitude may be changed by a suitable amount, and if no change in reading is obtained, it is reasonably certain that the amplitude is sufficient.

If desired, the valve $V_2$ may be preceded by a suitable amplifying stage (not shown), with or without a safety switch arranged similarly to $S_2$ which may be used in like manner for checking the level of the frequency $f_m$.

In order to avoid introducing further uncertainty, the switches should preferably be arranged for direct operation, that is, they should not be controlled by relays.

As an alternative to the continuous automatic variation of the frequency $f_m$ in the manner which has just been explained, it may be varied in several relatively large steps by manual control, or automatically, thereby producing a corresponding number of separate ranges for the apparatus. The scale factor of the ratiometer can be changed at the same time, giving increased precision of reading the instrument. In order to obtain this change of scale, it is necessary to maintain the reference current $I_m$ the same for all the ranges. This may be done in several ways, for example by adjusting resistance $r_8$, but it is preferable to arrange this in the following way. The modulator M in Fig. 4 is arranged to supply a constant frequency $f_m$ to the counter $C_2$, and a frequency $f_m/n$ to the transmitter T where $n$ is a factor which is given a different value for each range of the instrument. If the values of $n$ corresponding to the ranges are all constant then it does not matter if $f_m$ varies. One way of providing the adjustable factor $n$ is to include a frequency dividing arrangement in M, or as shown in Fig. 4, a separate frequency divider 20 may be provided which is arranged to energize counter $C_2$ when switch 21 is connected to position 22 thereby coupling the modulator M to the frequency divider 20, but a simpler method involving the use of a change speed gear can be employed when the frequency $f_m$ is obtained electro-mechanically as will now be explained. Instead of deriving $f_m$ from a relaxation oscillator, the modulation of the transmitter could be produced by a variable condenser comprising a suitably shaped vane or set of vanes rotated by a suitable motor. An E. M. F. at frequency $f_m$ for the counter circuit $C_2$ could then be obtained by mounting a soft iron armature on the same shaft as the condenser vane or vanes, and causing it to induce the E. M. F. in a coil wound on a magnetised yoke. The armature and condenser vanes may be shaped so that appropriate waveforms are obtained.

Suitable spur gears with adjustable ratio may be interposed between the condenser vanes and the armature to provide the adjustable factor $n$ mentioned above. In this case, the soft iron armature should be mounted on the motor driving shaft, the condenser vanes being driven through the gears, so that the armature always runs at the same speed. This arrangement ensures that any value of $n$ employed is quite constant, and the speed of the driving motor need not be exactly the same for all the values of $n$. The motor can be of any convenient type, but should be governed so that its speed is maintained within reasonable limits so that the frequency $f_d$ does not fall outside the response range of the receiver.

It will be evident that if only one range is required for the altimeter a fixed gear ratio may be used giving a convenient value of $n$ which need not be equal to 1.

Referring again to Fig. 2, it will be understood that the single counter C could be similar to Fig. 5 with all the elements having even-numbered suffixes omitted. The switches $S_{1a}$ and $S_{1b}$ would, of course, also be omitted, the connections being permanently made as though they were placed in the positions shown. If no feedback control voltage is required, the auxiliary counting circuit $C_3$ could also be omitted.

What is claimed is:

1. A beat frequency altimeter arrangement of the kind specified comprising a ratiometer having two operating coils, means for deriving beat frequency waves from the transmitted and reflected waves, means for deriving from the said beat frequency waves an electric current whose magnitude depends upon the said beat frequency, and means for supplying the said current and also a reference current included in said second-mentioned means, respectively to the said coils whereby variations of said reference current are prevented from affecting the indication of aid ratiometer.

2. A beat frequency altimeter arrangement of the kind specified comprising a ratiometer having two operating coils, means for deriving beat frequency waves from the transmitted and reflected waves, means for deriving from the said beat frequency waves an electric current whose magnitude depends upon the said beat frequency, means for supplying the said current to one of the said coils, and means for supplying to the other coil a reference current whose magnitude depends upon the frequency of the waves which modulate the said transmitted waves.

3. A beat frequency altimeter arrangement comprising a modulated transmitter, a detector for detecting the transmitted and the reflected waves of said transmitter, a ratiometer having two operating coils, means for deriving beat frequency waves from the transmitted and reflected waves, means for deriving from said beat frequency waves an electric current whose magnitude depends upon said beat frequency, means for applying said beat frequency waves to control the frequency of the modulation of said transmitter, means for supplying the said current to one of said coils, and means for supplying the other coil with a reference current whose magnitude depends upon the frequency of the modulation of said transmitter.

4. An arrangement according to claim 3 in which the modulation of said transmitter generates the frequencies which have a constant ratio, one of which said two frequencies modulates said transmitter while the other of said two frequencies is used to derive the said reference current.

5. A beat frequency altimeter arrangement comprising a modulated transmitter, a detector for detecting the transmitted and reflected waves of said transmitter, a ratiometer having two operating coils, means for deriving beat frequency waves from the transmitted and reflected waves, means for deriving from said beat frequency waves an electric current whose magnitude depends upon said beat frequency, means for applying beat frequency waves to control the frequency of the modulation of said transmitter, means for supplying the said current to one of said coils, means for causing said modulator to generate two modulation frequencies which have a constant proportionality, means for changing said constant proportionality in a plurality of steps, means for modulating said transmitter with one of said modulation frequencies, and means for deriving a reference current from the other of said modulation frequencies, and means for supplying the other coil of said ratiometer with said reference current, whereby said altimeter is provided with a corresponding plurality of different ranges.

6. An arrangement according to claim 3 in which the said current is proportionally dependent on said beat frequency.

7. A beat frequency altimeter arrangement comprising a transmitter of electrical energy waves, a detector for detecting the transmitted waves and the waves due to reflection of said transmitted waves; a frequency meter having two coils, means for deriving beat frequency waves from said transmitted and reflected waves, a source of energy having a reference frequency, counter circuit means for deriving electric currents from said beat and said reference frequency, the magnitude of which are dependent thereon, and means for applying said currents to said frequency meter coils.

8. An altimeter arrangement according to claim 7, in which said counter circuit means comprises two counter circuits operated from a common source of voltage, said counter circuits comprising similar arrangements of circuit elements having characteristics which vary similarly with changes in external conditions, and a thermionic valve acting as a switch to alternately charge and discharge a condenser included in said circuit elements in such a way that both the charge and the discharge currents pass in the same direction through the said coils, whereby said counter circuits each produce a current proportional to the frequency of the waves applied thereto.

9. An arrangement for measuring the frequency of electrical waves comprising a ratiometer having two operating coils, means for deriving from the said waves an electric current whose magnitude depends upon the said frequency, means for supplying the said current to one of the said coils, means for supplying a reference current included in said first-mentioned means to the other coil whereby variations of said current caused by variations of said reference current acting on said first-mentioned means are prevented from affecting the indication of said ratiometer, said means for deriving the said electric current comprising a counting circuit operated from a source of voltage and adapted to produce a current proportional to the freqency of the waves applied thereto, and further including means for deriving the said reference current from the said source of voltage.

JEFFREY DENNIS WESTON.

REFERENCES CITED

The following references are of record in the file of this patent:

UNITED STATES PATENTS

| Number | Name | Date |
|---|---|---|
| 649,008 | Steinmetz | May 3, 1900 |
| 1,665,857 | Needham | Apr. 10, 1928 |
| 1,902,496 | Fitzgerald | Mar. 21, 1933 |
| 2,051,018 | Umansky | Aug. 11, 1936 |
| 2,113,011 | White | Apr. 5, 1938 |
| 2,120,303 | Ullfricht | June 14, 1938 |
| 2,198,113 | Holmes | Apr. 23, 1940 |
| 2,206,903 | Lane et al. | July 9, 1940 |
| 2,222,586 | Sanders | Nov. 19, 1940 |
| 2,236,893 | Chaffee | Apr. 1, 1941 |
| 2,248,727 | Strobel | July 8, 1941 |
| 2,257,830 | Wolff et al. | Oct. 7, 1941 |
| 2,268,587 | Guanella | Jan. 6, 1942 |
| 2,307,316 | Wolff | Jan. 5, 1943 |
| 2,324,077 | Goodale et al. | July 13, 1943 |
| 2,371,988 | Granquist | Mar. 20, 1945 |
| 2,405,134 | Brown et al. | Aug. 6, 1946 |

FOREIGN PATENTS

| Number | Country | Date |
|---|---|---|
| 219,067 | Germany | Feb. 14, 1910 |